US008452491B2

(12) United States Patent
Miyauchi et al.

(10) Patent No.: US 8,452,491 B2
(45) Date of Patent: May 28, 2013

(54) IN-VEHICLE APPARATUS

(75) Inventors: Hideo Miyauchi, Obu (JP); Kyoji Oda, Gamagori (JP); Kenji Miyake, Anjo (JP)

(73) Assignee: DENSO CORPORATION, Kariya (JP)

( * ) Notice: Subject to any disclaimer, the term of this patent is extended or adjusted under 35 U.S.C. 154(b) by 361 days.

(21) Appl. No.: 12/805,421

(22) Filed: Jul. 30, 2010

(65) Prior Publication Data

US 2011/0106377 A1 May 5, 2011

(30) Foreign Application Priority Data

Oct. 30, 2009 (JP) ................................ 2009-250434

(51) Int. Cl.
*G06F 7/00* (2006.01)

(52) U.S. Cl.
USPC ............................................ 701/36; D10/41

(58) Field of Classification Search
USPC ............................................ 701/36; D10/41
See application file for complete search history.

(56) References Cited

U.S. PATENT DOCUMENTS 5,468,947 A * 11/1995 Danielson et al. ....... 235/472.02
5,781,869 A * 7/1998 Parlett et al. ...................... 701/1
2002/0062298 A1* 5/2002 Meier-Arendt .................. 707/1
2004/0062291 A1 4/2004 Watanabe
2008/0041135 A1* 2/2008 Okai ............................ 73/1.38
2008/0068934 A1 3/2008 Hiranuma et al.

FOREIGN PATENT DOCUMENTS

EP 0708388 A2 * 6/1995
JP U-S61-155978 9/1986
JP A-H2-73189 3/1990
JP H8-110385 A 4/1996
JP A-H8-289049 11/1996
JP A-H11-166988 6/1999
JP 2006-1498 A 1/2006
JP 2006-184108 A 7/2006
JP 2008-24070 A 2/2008

OTHER PUBLICATIONS

Office Action mailed Aug. 17, 2011 in corresponding JP application No. 2009-250434 (and English translation).

* cited by examiner

*Primary Examiner* — Mary Cheung
*Assistant Examiner* — Frederick Brushaber
(74) *Attorney, Agent, or Firm* — Posz Law Group, PLC

(57) ABSTRACT

An in-vehicle apparatus is disclosed. The in-vehicle apparatus is configured to perform a timer operation, acquire vehicle state information, and control the timer operation of the timer means in such manner that: the in-vehicle apparatus starts the timer operation when determining based on the vehicle state information that a condition for starting the timer operation is satisfied; and the in-vehicle apparatus stops the timer operation when determining based on the vehicle state information that a condition for stopping the timer operation is satisfied.

12 Claims, 4 Drawing Sheets

IN-VEHICLE APPARATUS

CROSS REFERENCE TO RELATED APPLICATION

The present application is based on Japanese Patent Application No. 2009-250434 filed on Oct. 30, 2009, disclosure of which is incorporated herein by reference.

BACKGROUND OF THE INVENTION

1. Field of the Invention

The present invention relates to an in-vehicle apparatus configured to perform a timer operation and control the timer operation.

2. Description of Related Art

Patent document 1 discloses a configuration having a stopwatch function, which starts and stops a timer operation (measurement of an amount of time elapsed) in response to a user manipulation on a predetermined button.

Patent Document 1: JP-2008-76068A corresponding to US 2008/0068934A

The inventors of the present application consider that, with the development of GUI (Graphical User Interface) technology for an in-vehicle apparatus, a stopwatch function such as disclosed in Patent Document 1 will be implemented in an in-vehicle apparatus. Discussion will be given below on an in-vehicle apparatus that simply has a stopwatch function in a manner similar to that disclosed in Patent Document 1. In this case, a timer operation is started in response to a user manipulation on a predetermined timer start button that is positionally-fixed. The timer operation is stopped in response to a user manipulation on a predetermined timer stop button that is also positionally-fixed. When a situation is that a user manipulates the positionally-fixed timer start or stop button in a stopped vehicle, no difficulty arises. However, when a situation is that a user manipulates the positionally-fixed timer start or stop button in a traveling vehicle, the user should search for location of the timer start or stop button while paying attention to driving, and should manipulate the button after conforming the location of the button. Hence, usability is low. As a result, even if an in-vehicle apparatus has a stopwatch function, the stopwatch function may not be used with the vehicle being traveling.

SUMMARY OF THE INVENTION

In view of the above and other points, it is an objective of the present invention to provide an in-vehicle apparatus that can allow the use of a timer function even when a vehicle is traveling, and that can provide high usability.

According to an aspect of the present invention, an in-vehicle apparatus for a vehicle is provided. The in-vehicle apparatus is configured to perform a timer operation, and configured to acquire vehicle state information, which is information on a vehicle state. The in-vehicle apparatus is further configured to control the timer operation, such that: the in-vehicle apparatus starts the timer operation when determining, based on the vehicle state, that a condition for starting the timer operation is satisfied; and the in-vehicle apparatus stops the timer operation when determining, based on the vehicle state information, that a condition for stopping the timer operation is satisfied.

According to the above in-vehicle apparatus, even when the vehicle is traveling, it is possible to control, e.g., start, stop etc., the timer operation based on the vehicle state without a user manipulation, on a predetermined timer start button or a predetermined timer stop button. It is therefore possible to provide high usability.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EXEMPLARY EMBODIMENTS

The exemplary embodiments will be described below with reference to the drawings.

Figure 1:
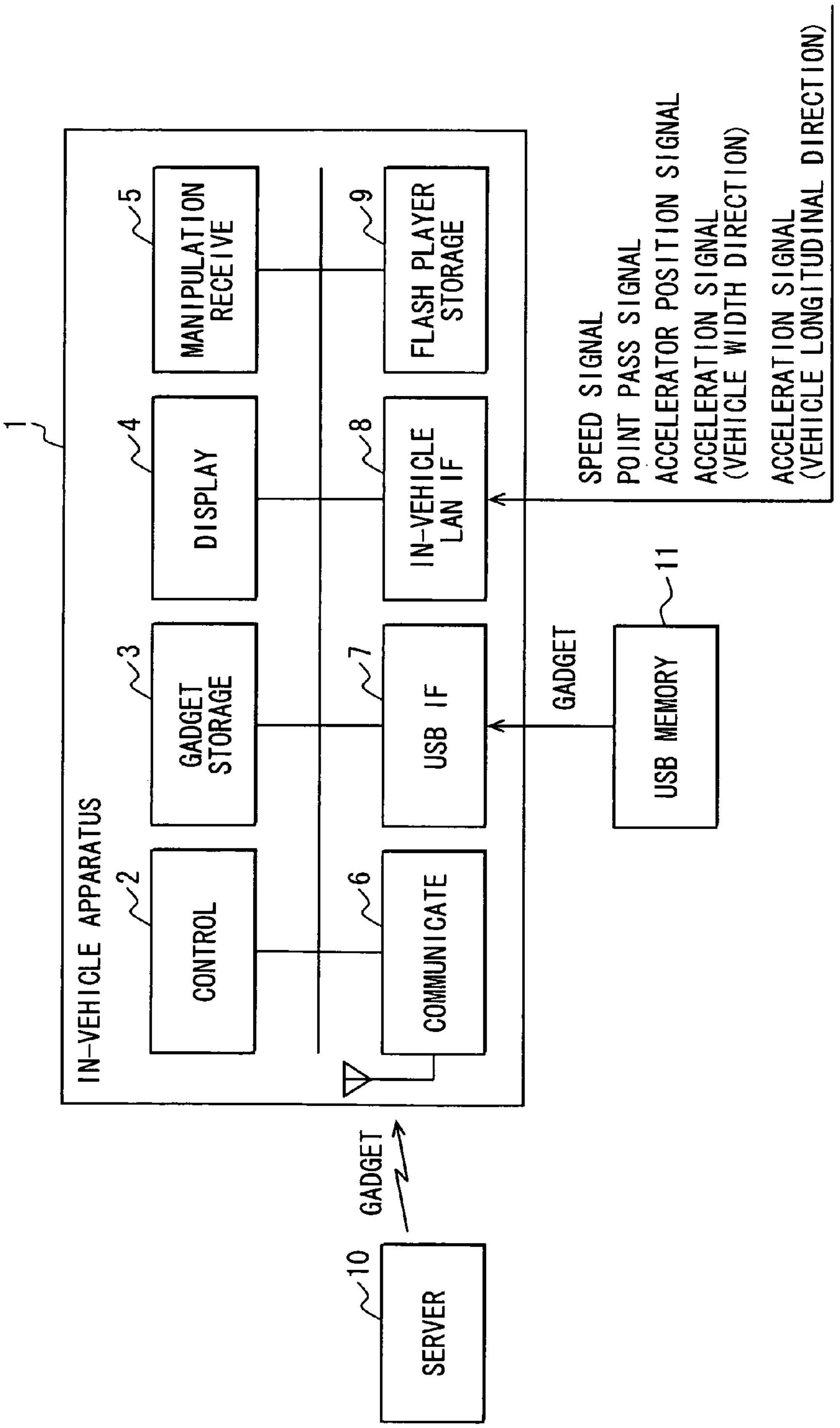
FIG. 1 is a functional block diagram illustrating an in-vehicle apparatus of one embodiment.

FIG. 1 is a functional block diagram illustrating an in-vehicle apparatus 1. The in-vehicle apparatus 1 is mounted to a vehicle. The in-vehicle apparatus 1 includes a controller 2, a gadget storage 3, a display device 4, a manipulation reception device 5, a communication device 6, a USB interface (IF) device 7, an in-vehicle LAN interface (IF) device 8, and a flash player storage 9. The foregoing components are connected with each other. The controller 2 can act as a timer section or means, and a control section or means. The display device 4 can act as a display means. The display device 4 can also act as notification means and a notifier. The in-vehicle LAN interface (IF) device 8 can act as vehicle state acquisition device or means, vehicle width direction acceleration acquisition device or means, and vehicle longitudinal direction acceleration device or means.

The controller 2 includes a central processing unit (CPU), a random access memory (RAM), a read-only memory (ROM) and the like. The controller 2 executes a control program thereby to control generally all of operations (e.g., a data management operation, a communication operation etc.) of the in-vehicle apparatus 1.

The gadget storage 3 can store therein a gadget, which may be received with the communication device 6 from, for example, a server 10 via a wide area wireless communication network such as a mobile communication network, a fixed communication network and the like. The gadget may be transferred to the USB interface device 7 from a USB memory 11, which is detachably connectable to the in-vehicle apparatus 1. In the above, the gadget is a relatively-small program (software) for enabling easy access to a tool that is frequently used by a user. The gadget is also called widget.

The display device 4 includes, for example, a liquid crystal display device. When receiving a display command signal from the controller 2, the display device 4 displays a display screen based on the display command signal.

The manipulation reception device 5 includes, for example, a touch sensitive switch or the like. The touch sensitive switch is provided on the display screen of the display device 4. In response to a user manipulation (e.g., touch) on the touch sensitive switch, the manipulation reception device 5 outputs a manipulation detection signal, which indicates content of the user manipulation, to the controller 2.

The in-vehicle LAN interface device 8 is connected, via an in-vehicle LAN, with various ECU and various sensors mounted to the vehicle. For example, the in-vehicle LAN interface device 8 receives a vehicle speed signal corresponding to a vehicle speed pulse outputted from a vehicle speed sensor. From an accelerator position sensor (e.g., an accelerator pedal position sensor, a throttle position sensor) for detecting an opening degree of an accelerator, the in-vehicle LAN interface device 8 receives an accelerator opening degree signal indicative of the opening degree of the accelerator. The in-vehicle apparatus 1 is connected with a navigation apparatus having a known navigation function. From the navigation apparatus, the in-vehicle LAN interface device 8 receives a registered point pass signal, which indicates that the vehicle has passed through a point pre-registered by a user. A point pre-registered by a user is also referred to herein as a registered point. From a vehicle width direction acceleration sensor for detecting acceleration of the vehicle in a vehicle width direction, the in-vehicle LAN interface device 8 receives a vehicle width direction acceleration signal indicative of the acceleration of the vehicle in the vehicle width direction. From a vehicle longitudinal direction acceleration sensor for detecting acceleration of the vehicle in a vehicle longitudinal direction, the in-vehicle LAN interface device 8 receives a vehicle longitudinal direction acceleration signal indicative of the acceleration of the vehicle in the longitudinal direction.

The flash player storage 9 stores therein a flash player, which is a program for displaying a swf file. The swf file may be made using Flash (registered trademark) of Adobe Co., Ltd.

The controller 2 starts the flash player stored in the flash player storage 9, thereby displaying an icon corresponding to the gadget stored in the gadget storage 3 on the display screen of the display device 4. With the icon being displayed on the display screen, the controller 2 allows the icon to act as the touch sensitive switch. When detecting the manipulation (e.g., touch), on the touch sensitive switch, the controller 2 calls a function corresponding to the gadget, executes a program corresponding to the gadget, or the like. For example, the controller 2 stores a gadget of stopwatch in the gadget storage 3, and displays an icon visually showing the stopwatch on the display screen of the display device 4. When detecting the manipulation on the icon of stopwatch displayed on the display screen, the controller 2 puts the stopwatch function in operation.

The in-vehicle apparatus 1 is in an operating state (i.e., powered-on state) when, for example, an ACC switch (accessory switch or ignition switch) is in ON. The in-vehicle apparatus 1 may be in a stopped state (i.e., powered-off state) when the ACC switch is in OFF. The in-vehicle apparatus 1 may have a navigation function, which provides a function of displaying a map, a function of specifying a present location of the vehicle, a function of displaying the present location of the vehicle on the map, a function of setting a destination, a function of retrieving a route from the present location to the destination, and the like.

Figure 2:
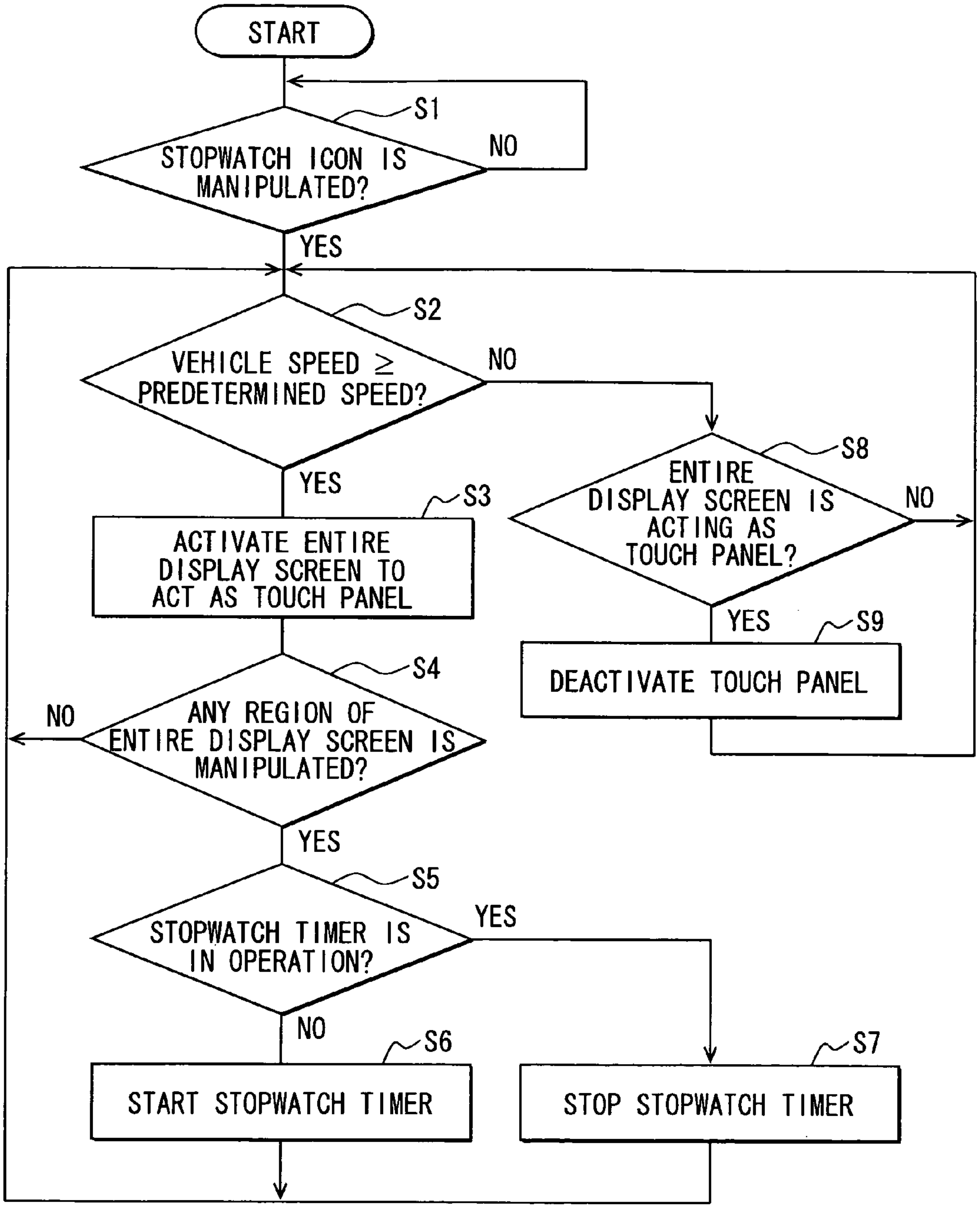
FIG. 2 is a flowchart illustrating a first procedure performed by the in-vehicle apparatus to control a timer operation.
Figure 3:
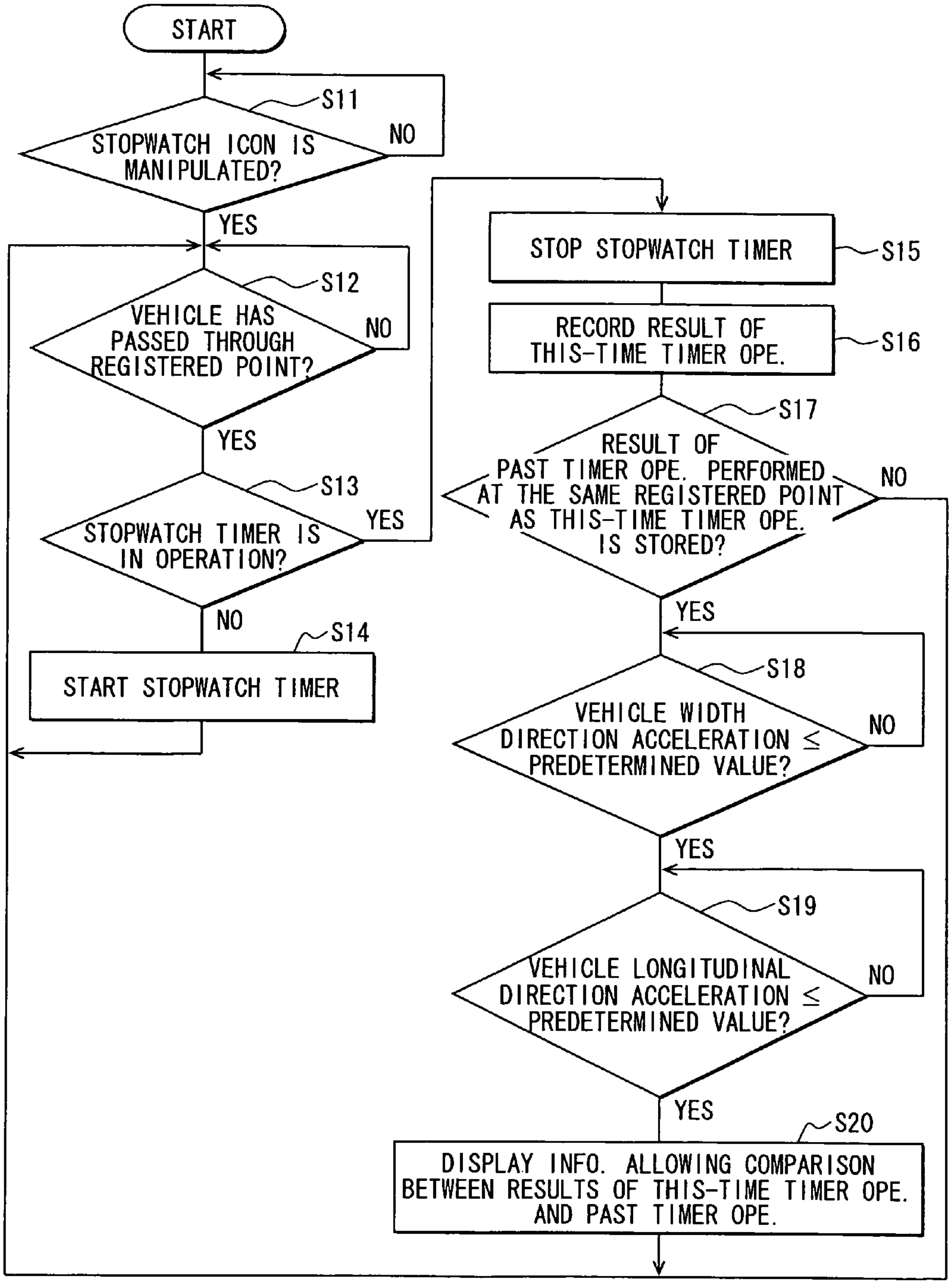
FIG. 3 is a flowchart illustrating a second procedure performed by the in-vehicle apparatus to control the timer operation.
Figure 4:
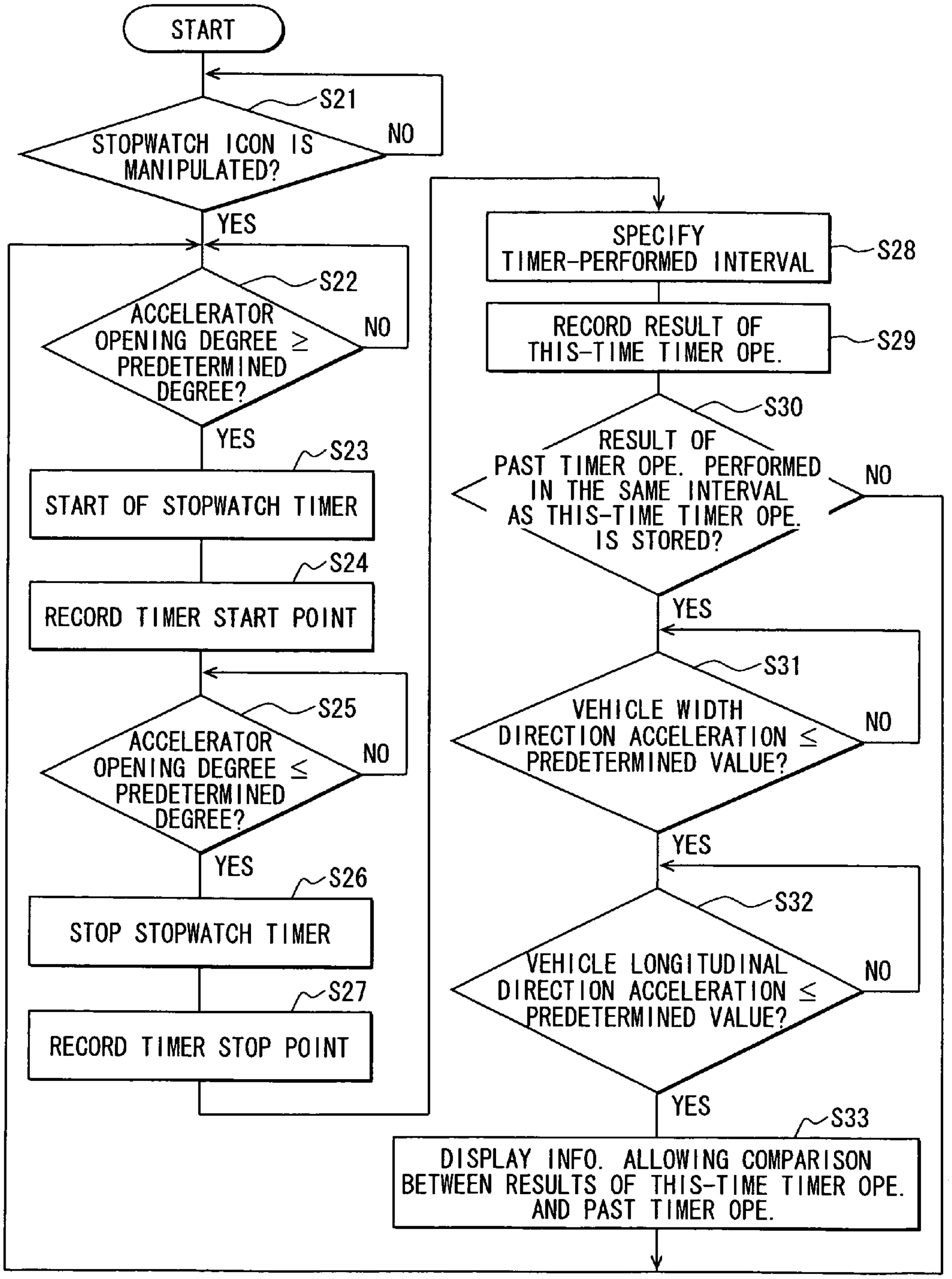
FIG. 4 is a flowchart illustrating a third procedure performed by the in-vehicle apparatus to control the timer operation.

The above-configured in-vehicle apparatus 1 has a stopwatch function, which will be described below with reference to FIGS. 2 to 4 in relation a condition for starting or stopping the stopwatch function.

(1) According to a first condition for starting or stopping the stopwatch function, the stopwatch function is started or stopped in response to the pressing of any region of the entire display screen of the display device 4 if the speed of the vehicle is greater than or equal to a predetermined speed.

(2) According to a second condition for starting or stopping the stopwatch function, the stopwatch function is started or stopped in response to the passing of the vehicle through a registered point.

(3) According to a third condition for starting or stopping the stopwatch function, the stopwatch function is started or stopped depending on the opening degree of the accelerator.

The first to third conditions will be more specifically described below in this order.

(First Condition)

A first procedure associated with the first condition is described below with reference to FIG. 2. The in-vehicle apparatus 1 may start performing the first procedure in FIG. 2 when the in-vehicle apparatus 1 is powered-on. The first procedure in FIG. 2 may be ended when the in-vehicle apparatus 1 is powered-off.

When the in-vehicle apparatus 1 is in the powered-on state due to, for example, the switching on of the ACC switch, the controller 2 determines at S1 whether the icon of the stopwatch function is manipulated or selected or by a user, based on the manipulation detection signal from, the manipulation reception device 5. When the controller 2 determined that the icon of the stopwatch function is manipulated or selected by a user, corresponding to "YES" at S1, the timer operation of stopwatch waits to start. At S2, based on the vehicle speed signal inputted from the vehicle speed sensor to the in-vehicle LAN interface device 8 via the in-vehicle LAN, the controller 2 determines whether the speed of the vehicle is greater than or equal to the predetermined speed (e.g., 10 km/h). When the controller 2 determines that the speed of the vehicle is greater than or equal to the predetermined speed, corresponding to "YES" at S2, the process proceeds to S3. At S3, the controller 2 activates the entire display screen of the display device 4 to act as a touch sensitive panel, so that the entire display screen of the display device 4 acts as a touch sensitive panel. That is, the controller 2 waits for a user (e.g., a driver of the vehicle) to manipulate any region of the entire display screen of the display device 4.

At S4, the controller 2 determines whether any region of the entire display screen of the display device 4 is manipulated by a user, based on the manipulation detection signal inputted from the manipulation reception device 5. When the controller 2 determines that any region of the entire display screen of the display device 4 is manipulated by a user, corresponding to "YES" at S4, the process proceeds to S5. At S5, the controller 2 determines whether the timer operation of stopwatch is in operation (i.e., is running) at the time of S4. In other words, the controller 2 determines whether the timer operation of stopwatch is now in operation. When the controller 2 determines that the timer operation of stopwatch is not in operation, corresponding to "NO" at S5, the process proceeds to S6. At S6, the controller 2 starts the timer operation of stopwatch. After S6, the process returns to S2. When the controller 2 determines that the timer operation of stopwatch is in operation, corresponding to "YES" at S5, the process proceeds to S7. At S7, the controller 2 stops the timer operation of stopwatch. After S7, the process returns to S2.

When the controller 2 determines that the speed of the vehicle is not greater than or equal to the predetermined speed, corresponding to "NO" at S2, the process proceeds to S8. At S8, the controller 2 determines whether the entire display screen of the display device 4 is activated to act as the touch sensitive panel. When the controller 2 determines that the entire display screen of the display device 4 is activated to act as the touch sensitive panel, corresponding to "YES" at S8, the process proceeds to S9. At S9, the controller 2 deactivates the touch sensitive panel provided on the entire display screen of the display device 4 so that the entire display screen does not act as the touch sensitive panel. After S9, the process returns to S2.

According to the above first procedure, the stopwatch function can be controlled (e.g., started and stopped) in response to user manipulation on any region of the entire display screen of the display device 4 when the speed of the vehicle is greater than or equal to the predetermined speed. A user can control the stopwatch function without manipulating a predetermined timer start button or a predetermined timer stop button.

(Second Condition)

A second procedure associated with the second condition for starting and stopping the timer operation is described below with reference to FIG. 3. The in-vehicle apparatus 1 may start performing the second procedure in FIG. 3 when the in-vehicle apparatus 1 is powered-on. The second procedure in FIG. 3 may be ended when the in-vehicle apparatus 1 is powered-off. At S11, the controller 2 determines whether the icon of stopwatch is manipulated by a user. When the controller 2 determines that the icon of stopwatch is manipulated by a user, corresponding to "YES" at S11, the timer operation of stopwatch waits to start. At S12, the controller 2 determines whether the vehicle has passed through a point pre-registered by a user, based on the registered point pass signal inputted from the navigation apparatus to the in-vehicle LAN interface device 8 via the in-vehicle LAN. When the controller 2 determines that the vehicle has passed through a point pre-registered by a user, corresponding to "YES" at S12, the process proceeds to S13. At S13, the controller 2 determines whether the timer operation of stopwatch is in operation.

When the controller 2 determines that the timer operation of stopwatch is not in operation, corresponding to "NO" at S13, the process proceeds to S14. At S14, the controller 2 starts the timer operation of stopwatch, and the process returns to S12. When the controller 2 determines that the timer operation of stopwatch is in operation, corresponding to "YES" at S13, the process proceeds to S15. At S15, the controller 2 stops the timer operation of stopwatch. At S16, the controller 2 records a result of the timer operation performed this time in a predetermined memory area.

At S17, the controller 2 determines whether the predetermined memory area stores therein a result of the timer operation that was performed in past at the same registered point as the timer operation performed this time at. When the controller 2 determines that the predetermined memory area stores therein the result of the timer operation that was performed in past at the same registered point as the timer operation performed this time at, corresponding to "YES" at S17, the process proceeds to S18. At S18, the controller 2 determines whether the acceleration of the vehicle in the vehicle width direction is less than or equal to a predetermined value, based on the vehicle width direction acceleration signal inputted from the vehicle width direction acceleration sensor via the in-vehicle LAN interface device 8. When the controller 2 determines that the acceleration of the vehicle in the vehicle width direction is less than or equal to the predetermined value, corresponding to "YES" at S18, the process proceeds to S19. At S19, the controller 2 determines whether the acceleration of the vehicle in the vehicle longitudinal direction is less then or equal to a predetermined value, based on the vehicle longitudinal direction acceleration signal inputted from the vehicle longitudinal direction acceleration sensor via the in-vehicle LAN interface device 8. When the controller 2 determines that the acceleration in the vehicle longitudinal direction is less then or equal to the predetermined value, corresponding to "YES" at S19, the process proceeds to S20. At S20, the controller 2 displays, on the display screen of the display device 4 for example, information that allows comparison between the result of the timer operation performed this time and the result of the timer operation preformed in past.

According to the above second procedure, every time the vehicle passes through a point pre-registered by a user, the in-vehicle apparatus 1 can automatically control (e.g., start, stop etc.) the stopwatch function without a user manipulation on the predetermined timer start button or the predetermined timer stop button.

(Third Condition)

A third procedure associated with the third condition for starting and stopping the timer operation is described below with reference to FIG. 4. The in-vehicle apparatus 1 may start performing the third procedure in FIG. 4 when the in-vehicle apparatus 1 is powered-on. The third procedure may be ended when the in-vehicle apparatus 1 is powered-off At S21, the controller 2 determines whether the icon of stopwatch is manipulated by user. When the controller 2 determines that the icon of stopwatch is manipulated by user, corresponding to "YES" at S21, the timer operation of stopwatch waits to start. At S22, the controller 2 determines whether the opening degree of the accelerator becomes greater than or equal to a predetermined opening degree, based on the accelerator opening degree signal inputted from the accelerator position sensor to the in-vehicle LAN interface device 8 via the in-vehicle LAN. When the controller 2 determines that the opening degree of the accelerator becomes greater than or equal to the predetermined opening degree, corresponding to "YES" at S22, the controller 2 starts the timer operation of stopwatch at S23. At S24, the controller 2 records a timer start point in the predetermined memory area. In the above, the timer start point is a point at which the opening degree of the accelerator becomes greater than or equal to the predetermined opening degree. In other words, the timer start point is a point at which the timer operation of stopwatch is started.

At S25, the controller 2 determines whether the accelerator opening degree becomes smaller than the predetermined opening degree, based on the accelerator opening degree signal inputted from the accelerator position sensor to the in-vehicle LAN interface device 8 via the in-vehicle LAN. When the controller 2 determines that the accelerator opening degree becomes smaller than the predetermined opening degree, corresponding to "YES" at S25, the controller 2 stops the timer operation of stopwatch at S26. At S27, the controller 2 records a timer stop point in the predetermined memory area. In the above, the timer stop point is a point at which the accelerator opening degree becomes smaller than the predetermined opening degree, in other words, the timer stop point is a point at which the timer operation of stopwatch is stopped.

At S28, the controller 2 specifies an interval between the timer start point and the timer stop point as a timer-performed interval, in which the timer operation has been performed this time. At S29, the controller 2 records a result of the timer operation performed this time in the predetermined memory area so that the result of the timer operation is associated with the timer-performed interval. At S30, the controller 2 determines whether the predetermined memory area stores therein a result of the timer operation that was performed in past in the same interval as the timer operation has been performed this time. When the controller 2 determines that the predetermined memory area stores therein a result of the timer that was performed in past in the same interval as the timer performed this time in, the determination "YES" is made at S30 and the process proceeds to S31. At S31, the controller 2 determines whether the acceleration of the vehicle in the vehicle width direction is less than or equal to the predetermined value, based on the vehicle width direction acceleration signal inputted from the vehicle width direction acceleration sensor via the in-vehicle LAN interface device 8. When the controller 2 determines that the acceleration of the vehicle in the vehicle width direction is less than or equal to the predetermined value, corresponding to "YES" at S31, the process proceeds to S32. At S32, the controller 2 determines whether the acceleration of the vehicle in the vehicle longitudinal direction is less than or equal to the predetermined value, based on the vehicle longitudinal direction acceleration signal inputted from the vehicle longitudinal direction acceleration sensor via the in-vehicle LAN interface device 8. When the controller 2 determines that the acceleration of the vehicle in the vehicle longitudinal direction is less than or equal to the predetermined value, corresponding to "YES" at S32, the process proceeds to S33. At S33, the controller 2 displays, on the display screen of the display device 4, information that allows comparison between the result of the timer operation performed this time and the result of the timer performed in past.

According to the above third procedure, every time a user operates an accelerator (e.g., acceleration pedal), the in-vehicle apparatus 1 can automatically control (e.g., start, stop etc.) the stopwatch function without a user manipulation on the predetermined timer start button or the predetermined timer end button.

The above first to third procedures may be performed parallel and simultaneously. That is, while the timer operation of stopwatch is waiting to start, the controller 2 may make a first determination of whether the speed of the vehicle is greater than or equal to the predetermined speed, a second determination of whether the vehicle has passed through a point pre-registered by a user, and a third determination of whether the opening degree of the accelerator becomes greater than or equal to the predetermined opening degree. When affirmative (YES) is made in one of the first to third determinations, the controller 2 may perform the processes corresponding to the affirmative (YES) made in the one of the first to third determinations.

According to the present embodiment as described above, the in-vehicle apparatus 1 is configured to start or stop the stopwatch function in response to the satisfying of any one of predetermined conditions. A first condition of the predetermined conditions is such that any region of the entire display screen of the display device 4 is manipulated by a user on a condition that the speed of the vehicle is greater than or equal to the predetermined speed. A second condition of the predetermined conditions is such that the vehicle has passed through a point pre-registered by a user. The third condition of the predetermined conditions is such that the opening degree of the accelerator becomes greater than or equal to the predetermined opening degree. According to the above configuration, the in-vehicle apparatus 1 can control, e.g., start, stop etc., the stopwatch function based on vehicle state information without a user manipulation on a predetermined timer start button or a predetermined timer stop button. Therefore, the in-vehicle apparatus 1 can provide high usability.

The above embodiments can be modified and extended in various ways, examples of which will be described below.

When the in-vehicle apparatus controls (e.g., starts, stops etc.) the stopwatch function in response to the pressing, of any region of the entire display screen of the display device 4 on a condition that the speed of the vehicle is greater than or equal to the predetermined speed, the in-vehicle apparatus 1 may also perform the following operations. The in-vehicle apparatus 1 may record a timer start point and a timer stop point, may specify an interval between the timer start point and the timer stop point as a timer-performed interval, and may record a result of the timer operation performed this time so that the result of the timer operation is associated with the specified timer-performed interval. On the display screen of the display device 4, the in-vehicle apparatus 1 may display the information that allows comparison between the result of the timer operation performed this time and the result of the timer operation performed in past.

The information allowing comparison between the result of the timer operation performed this time and the result of the timer operation performed in past is not be limited to being displayed on a display screen of the display device 4. The information may be outputted as sound from a speaker (not shown). Alternatively, the information allowing comparison between the result of the timer operation performed this time and the result of the timer operation performed in past may be presented on a display screen of the display device 4 and outputted as sound from a speaker (not shown) at the same time.

According to an aspect of embodiments, an in-vehicle apparatus for a vehicle includes: a timer section configured to perform a timer operation; and a vehicle state acquisition device configured to acquire vehicle state information, which is information on a vehicle state. The in-vehicle apparatus further includes a control section configured to control the timer operation of the timer section, such that: the control section starts the timer operation of the timer section when the control section determines, based on the vehicle state information acquired by the vehicle state acquisition device, that a condition for starting the timer operation is satisfied; and the control section stops the timer operation of the timer section when, the control section determines, based on the vehicle state information acquired by the vehicle state acquisition device, that a condition for stopping the timer operation is satisfied.

According to the in-vehicle apparatus, even when the vehicle is traveling, it is possible to control, e.g., start, stop etc., the timer operation based on the vehicle state without a user manipulation on a predetermined timer start button or a predetermined timer stop button. It is therefore possible to provide high usability.

The above in-vehicle apparatus may be configured in the following way. When speed of the vehicle is greater than or equal to a predetermined speed, an entire display screen of a display device is activated to act as manipulation receiver for receiving thereon manipulation. The vehicle state acquisition device acquires manipulation information, which is information on whether any region of the entire display screen acting as the manipulation receiver is pressed. When the control section determines, based on the manipulation information acquired by the vehicle state acquisition device, that any region of the entire display screen acting as the manipulation receiver is pressed while the timer operation is not in operation, the control section determines that the condition for starting the timer operation is satisfied, and the control section starts the timer operation of the timer section. When the control section determines, based on the manipulation information acquired by the vehicle state acquisition device, that any region of the entire display screen acting as the manipulation receiver is pressed while the timer operation is in operation, the control section determines that the condition for stopping the timer operation is satisfied, and the control section stops the timer operation of the timer section.

According to the above configuration, the in-vehicle apparatus can start the timer operation in response to user's pressing of any region of the entire display screen of the display device. The in-vehicle apparatus can stop the timer operation in response to the user's pressing of any region of the entire display screen of the display device when the timer operation is in operation.

The above in-vehicle apparatus may be configured in the following way. The vehicle state acquisition device acquires registered point pass information, which is information indicating, based on present location of the vehicle and a registered point, whether the vehicle has passed through the registered point, the registered point being a point pre-registered. When the control section determines, based on the registered point pass information acquired by the vehicle state acquisition device, that the vehicle has passed through the registered point while the time operation is not in operation, the control determines that the condition for starting the timer operation is satisfied, and the control section starts the timer operation of the timer section. When the control section determines, based on the registered point pass information acquired by the vehicle state acquisition device, that the vehicle has passed through the registered point while the time operation is in operation, the control determines that the condition for stopping the timer operation is satisfied, and the control section stops the timer operation of the timer section.

According to the above configuration, the in-vehicle apparatus can automatically start or stop the timer operation in response to the passing of the vehicle through the registered point.

The above in-vehicle apparatus may be configured in the following way. The vehicle state acquisition device acquires accelerator opening degree information, which is information on opening degree of an accelerator of the vehicle. When the control section determines, based on the accelerator opening degree information acquired by the vehicle state acquisition device, that the opening degree of the accelerator becomes greater than or equal to a predetermined opening degree while the timer operation is not in operation, the control section determines that the condition for starting the timer operation is satisfied, and the control section starts the timer operation of the timer section. When the control section determines, based on the accelerator opening degree information acquired by the vehicle state acquisition device, that the opening degree of the accelerator becomes smaller than the predetermined opening degree while the timer operation is in operation, the control section determines that the condition for stopping the timer operation is satisfied, and the control section stops the timer operation of the timer device.

According to the above configuration, the in-vehicle apparatus can automatically start or stop the timer operation in response to a change in the opening degree of the accelerator.

The above in-vehicle apparatus may be configured in the following way. The timer operation that has been performed in last by the timer section is a last timer operation. The timer operation that was performed before the last timer operation by timer section is a past timer operation. The past timer operation that was performed in the same interval as the last timer operation has been performed in is a same-interval past timer operation. After the last timer operation has been preformed by the timer section, the control section causes a notifier to notify information that allows comparison between a result of the last timer operation and a result of the same-interval past timer operation.

According to the above configuration, the in-vehicle apparatus 1 can provide a user with the information that allows comparison between a result of the last timer operation and a result of the same-interval past timer operation.

The above in-vehicle apparatus may further include a vehicle width direction acceleration acquisition device configured to acquire information on acceleration of the vehicle in a vehicle width direction. The in-vehicle apparatus may be configures such that when the information acquired by the vehicle width direction acceleration acquisition device indicates that the acceleration of the vehicle in the vehicle width direction is less than or equal to a predetermined value, the control section causes the notifier to notify the information that allows comparison between the result of the last timer operation and the result of the same-interval past timer operation.

According to the above configuration, when the vehicle is traveling on a straight road with high stability for example, i.e., when the acceleration of the vehicle in the vehicle width direction is less than or equal to the predetermined value, the in-vehicle apparatus can provide a user with the information that allows comparison between a result of the timer operation that has been performed this time and the timer operation that was performed in past.

The above in-vehicle apparatus may further include a vehicle longitudinal direction acceleration acquisition device configured to acquire information on acceleration of the vehicle in a vehicle longitudinal direction. The in-vehicle apparatus may be configured such that when the information acquired by the vehicle longitudinal direction acceleration acquisition device indicates that the acceleration of the vehicle in the vehicle longitudinal direction is less than or equal to a predetermined value, the control section causes the notifier to notify the information that allows comparison between the result of the last timer operation and the result of the same-interval past timer operation.

According to the above configuration, when the vehicle is traveling without abrupt acceleration or deceleration and the vehicle traveling stability is high for example, i.e., when the acceleration of the vehicle in the vehicle longitudinal direction is less than or equal to the predetermined value, the in-vehicle apparatus can provide a user with the information that allows comparison between a result of the timer operation that has been performed this time and the timer operation that was performed in past.

While the invention has been described above with reference to various embodiments thereof, it is to be understood that the invention is not limited to the above described embodiments and constructions. The invention is intended to cover various modifications and equivalent arrangements.

Further, each or any combination of procedures, processes, steps, or means explained in the above may be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units may be included in a software program, which is contained in a computer-readable storage media or is installed in a computer via a communications network.

What is claimed is:

1. An in-vehicle apparatus for a vehicle, comprising:

timer means for performing a timer operation;

vehicle state acquisition means for acquiring vehicle state information, which is information on a vehicle state; and control means for controlling the timer operation of the timer means, such that:

the control means starts the timer operation of the timer means when the control means determines, based on the vehicle state information acquired by the vehicle state acquisition means, that a condition for starting the timer operation is satisfied; and the control means stops the timer operation of the timer means when the control means determines, based on the vehicle state information acquired by the vehicle state acquisition means, that a condition for stopping the timer operation is satisfied, wherein an entire display screen of a display device is activated to act as manipulation receiver for receiving thereon manipulation, when speed of the vehicle on which the in-vehicle apparatus is mounted is greater than or equal to a predetermined speed;

the vehicle state acquisition means further acquires manipulation information, which is information on whether any region of the entire display screen acting as the manipulation receiver is pressed;

the control means determines that the condition for starting the timer operation is satisfied, and the control means starts the timer operation of the tinier means, when the control means determines, based on the manipulation information acquired by the vehicle state acquisition means, that any region of the entire display screen acting as the manipulation receiver is pressed while the timer operation is not in operation; and the control means determines that the condition for stopping the timer operation is satisfied, and the control means stops the timer operation of the timer means, when the control mean determines, based on the manipulation information acquired by the vehicle state acquisition means, that any region of the entire display screen acting as the manipulation receiver is pressed while the timer operation is in operation.

2. The in-vehicle apparatus according to claim 1, wherein:

the vehicle state acquisition means acquires registered point pass information, which is information indicating, based on present location of the vehicle and a registered point, whether the vehicle has passed through the registered point, the registered point being a point pre-registered;

when the control means determines, based on the registered point pass information acquired by the vehicle state acquisition means, that the vehicle has passed through the registered point while the time operation is not in operation, the control determines that the condition for starting the timer operation is satisfied, and the control means starts the timer operation of the timer means; and when the control means determines, based on the registered point pass information acquired by the vehicle state acquisition means, that the vehicle has passed through the registered point while the time operation is in operation, the control determines that the condition for stopping the timer operation is satisfied, and the control means stops the timer operation of the timer means.

3. The in-vehicle apparatus according to claim 1, wherein:

the vehicle state acquisition means acquires accelerator opening degree information, which is information on opening degree of an accelerator of the vehicle;

when the control means determines, based on the accelerator opening degree information acquired by the vehicle state acquisition means, that the opening degree of the accelerator becomes greater than or equal to a predetermined opening degree while the timer operation is not in operation, the control means determines that the condition for starting the timer operation is satisfied, and the control means starts the timer operation of the timer means; and when the control means determines, based on the accelerator opening degree information acquired by the vehicle state acquisition means, that the opening degree of the accelerator becomes smaller than the predetermined opening degree while the timer operation is in operation, the control means determines that the condition for stopping the timer operation is satisfied, and the control means stops the timer operation of the timer means.

4. The in-vehicle apparatus according to claim 1, wherein:

the timer operation that has been performed in last by the timer means is a last timer operation;

the timer operation that was performed before the last timer operation by timer means is a past timer operation;

the past timer operation that was performed in the same interval as the last timer operation has been performed in is a same-interval past timer operation; and after the last timer operation has been preformed by the timer means, the control means causes a notifier to notify information that allows comparison between a result of the last timer operation and a result of the same-interval past timer operation.

5. The in-vehicle apparatus according to claim 4, further comprising:

vehicle width direction acceleration acquisition means for acquiring information on acceleration of the vehicle in a vehicle width direction, wherein:

when the information acquired by the vehicle width direction acceleration acquisition means indicates that the acceleration of the vehicle in the vehicle width direction is less than or equal to a predetermined value, the control means causes the notifier to notify the information that allows comparison between the result of the last timer operation and the result of the same-interval past timer operation.

6. The in-vehicle apparatus according to claim 4, further comprising:

vehicle longitudinal direction acceleration acquisition means for acquiring information on acceleration of the vehicle in a vehicle longitudinal direction, wherein:

when the information acquired by the vehicle longitudinal direction acceleration acquisition means indicates that the acceleration of the vehicle in the vehicle longitudinal direction is less than or equal to a predetermined value, the control means causes the notifier to notify the information that allows comparison between the result of the last timer operation and the result of the same-interval past timer operation.

7. An in-vehicle apparatus for a vehicle, comprising:

an in-vehicle interface configured to acquire LAN signals indicating vehicle state information, which is information on a vehicle state, and acquire LAN signals indicating manipulation information, which is information on whether any region of the entire display screen acting as the manipulation receiver is pressed; and a controller cooperatively operable with the in-vehicle interface, the controller being configured to perform a timer operation;

determine, based on the vehicle state information acquired by the in-vehicle interface, whether a condition for starting the timer operation is satisfied, determine, based on the vehicle state information acquired by the in-vehicle interface, whether a condition for stopping the timer operation is satisfied, start the timer operation when the condition for starting the timer operation is determined to be satisfied;

stop the timer operation when the condition for stopping the timer operation is determined to be satisfied;

determine whether a speed of the vehicle is greater than or equal to a predetermined speed;

activate an entire display screen of a display device to act as manipulation receiver for receiving thereon a manipulation, when the speed of the vehicle is determined to be greater than or equal to the predetermined speed;

cancel the entire display screen of a display device from being activated to act as manipulation receiver for receiving thereon the manipulation, when the speed of the vehicle on which the in-vehicle device is mounted is determined to not be greater than or equal to the predetermined speed;

wherein the controller is further configured:

to determine that the condition for starting the timer operation is satisfied and to start the timer operation, when the controller determines, based on the manipulation information acquired by the in-vehicle interface, that any region of the entire display screen acting as the manipulation receiver is pressed while the timer operation is not in operation; and to determine that the condition for stopping the timer operation is satisfied and to stop the timer operation, when the controller determines, based on the manipulation information acquired by the in-vehicle interface, that any region of the entire display screen acting as the manipulation receiver is pressed while the timer operation is in operation.

8. The in-vehicle apparatus according to claim 7, wherein:

the in-vehicle interface acquires registered point pass information, which is information indicating, based on present location of the vehicle and a registered point, whether the vehicle has passed through the registered point, the registered point being a point pre-registered;

when the controller determines, based on the registered point pass information acquired by the in-vehicle interface, that the vehicle has passed through the registered point while the time operation is not in operation, the controller determines that the condition for starting the timer operation is satisfied, and the controller starts the timer operation; and when the controller determines, based on the registered point pass information acquired by the in-vehicle interface, that the vehicle has passed through the registered point while the time operation is in operation, the controller determines that the condition for stopping the timer operation is satisfied, and the controller stops the timer operation.

9. The in-vehicle apparatus according to claim 7, wherein:

the in-vehicle interface acquires accelerator opening degree information, which is information on opening degree of an accelerator of the vehicle;

when the controller determines, based on the accelerator opening degree information acquired by the in-vehicle interface, that the opening degree of the accelerator becomes greater than or equal to a predetermined opening degree while the timer operation is not in operation, the controller determines that the condition for starting the timer operation is satisfied, and the controller starts the timer operation; and when the controller determines, based on the accelerator opening degree information acquired by the in-vehicle interface, that the opening degree of the accelerator becomes smaller than the predetermined opening degree while the timer operation is in operation, the controller determines that the condition for stopping the timer operation is satisfied, and the controller stops the timer operation.

10. The in-vehicle apparatus according to claim 7, wherein:

the timer operation that has been performed in last is a last timer operation;

the timer operation that was performed before the last timer operation is a past timer operation;

the past timer operation that was performed in the same interval as the last timer operation has been performed in is a same-interval past timer operation; and after the last timer operation has been preformed, the controller causes a notifier to notify information that allows comparison between a result of the last timer operation and a result of the same-interval past timer operation.

11. The in-vehicle apparatus according to claim 10, wherein:

the in-vehicle interface further acquires information on acceleration of the vehicle in a vehicle width direction, when the information on acceleration of the vehicle in the vehicle width direction indicates that the acceleration of the vehicle in the vehicle width direction is less than or equal to a predetermined value, the controller causes the notifier to notify the information that allows comparison between the result of the last timer operation and the result of the same-interval past timer operation.

12. The in-vehicle apparatus according to claim 10, wherein:

the in-vehicle interface further acquires information on acceleration of the vehicle in a vehicle longitudinal direction, wherein:

when the information on acceleration of the vehicle in the vehicle longitudinal direction indicates that the acceleration of the vehicle in the vehicle longitudinal direction is less than or equal to a predetermined value, the controller causes the notifier to notify the information that allows comparison between the result of the last timer operation and the result of the same-interval past timer operation.

* * * * *